May 12, 1964 R. D. ALLISON 3,132,795

PHONOGRAPH RECORD ENVELOPE

Filed Aug. 29, 1961 2 Sheets-Sheet 1

INVENTOR

ROBERT D. ALLISON

BY John F. Stevens

AGENT

INVENTOR
ROBERT D. ALLISON
BY John F. Stevens
AGENT

United States Patent Office 3,132,795

Patented May 12, 1964

3,132,795

PHONOGRAPH RECORD ENVELOPE

Robert D. Allison, West Hartford, Conn., assignor to United States Envelope Company, Springfield, Mass., a corporation of Maine Filed Aug. 29, 1961, Ser. No. 134,727
1 Claim. (Cl. 229—68)

This invention relates generally to envelopes for the storage of disc phonograph records, or the like, and more specifically this invention relates to envelopes made from one piece blanks of bendable material, such as heavy paper, folded to accommodate a disc record in relatively snug containment.

The present invention provides a record envelope of single piece, substantially square construction, being open along one of its edges for record entrance, and closed along its other three edges by boundary folds of the envelope material.

This invention further provides a record envelope constructed so as to provide a flat, narrow strip, perpendicular to the planes of the front and back panels at one of its closed edges to enable the identity of the record to be printed thereon, and at the same time provide the edges with sufficient strength to withstand abuse caused by the careless manner in which records are sometimes inserted into the envelopes.

In the storage of phonograph disc records, it is usually customary to stack records on shelves or in cabinets in such a manner that only an edge of the envelope is exposed for identification of that record. When records are stored in this manner, it is convenient for the exposed edge to be substantially flat, so that the title of the record can be imprinted on this flat edge to eliminate the necessity of taking the envelope all the way from the stack to look at its face. Another desirable feature is that the envelope have sufficient strength at its edges to prevent edge bursting or tearing during rough use.

Previously, in the construction of record envelopes having a flat edge for printing the record's identification, strength has sometimes been sacrificed to obtain a flat printing edge by binding two square pieces of cardboard together with a sheet of paper, leaving one edge open for the insertion and removal of the record. The bound edges in this case are substantially flat for the width provided by the two thicknesses of board. Other record envelopes have been made by folding an elongated, rectangular, sheet of material into a square folder and then binding two edges with paper or similar material, which gives one edge sufficient strength, but the two remaining paper bound edges remain weak. This lack of strength has been remedied in some situations by using a rectangular blank folded in its center, and having one panel provided with infolded flaps to be adhesively secured to the opposite panel. However, this type of jacket lacks the advantage of having a flat printing surface at one of its edges. Other attempts to provide a flat edge for printing include the use of a separate reinforcing strip at an edge of the record envelope to replace the natural sharp edge of the fold. However, from a production standpoint, it is desirable to use single piece blanks.

The present invention attempts to overcome the disadvantages of these previous record envelope designs by use of a simple, easily folded, one-piece blank. As in the past, the size of the envelope is determined by the diameter of the record for which the envelope is intended. In the record envelope according to the present invention, a blank is cut and scored in such a manner as to define two wall panels in slightly spaced relationship, with the opposite lateral boundaries of the panels being colinear and the two adjacent panel boundaries being connected by a narrow, integral strip which subsequently serves as a flat edge surface to be used for imprinting the contained record's identification. The front or rear wall panel, or both, are provided with laterally extending boundary flaps which serve the dual purpose of providing boundary strength and providing space between the panels to support the narrow identification strip after the jacket has been folded. Generally, the envelope is produced from a blank, as briefly described above, by folding the laterally extending flaps inwardly so they lie flat against the panel from which they extend, folding the panels into opposed relationship, and adhesively connecting the flaps of one panel to the flaps or boundaries of the opposite panel.

In similar record envelopes of the prior art, the front and rear wall panels have usually been folded into opposed relationship along a single fold line which results in a relatively thin or sharp edge unsuitable for printing. In the present invention, a flat edge is produced by providing two parallel score lines between the panels, spaced apart a sufficient distance to provide a strip for the printing of the description of the record. The integral identification strip between the score lines normally lies perpendicular to the planes of the front and rear panels of the folded envelope, and flaps extend inwardly along this strip between the score lines a sufficient distance to maintain the panels in slightly spaced relation, so as to support the strip in its said normally perpendicular position.

Various modifications of the record envelope or jacket provided by this invention may be made as hereinafter described.

Figure 1:
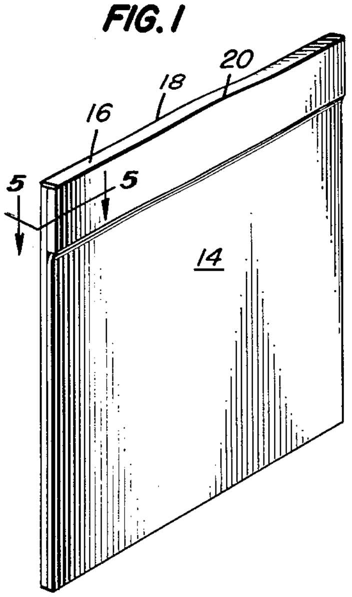
FIGURE 1 is a perspective view of a record envelope according to this invention.
Figure 2:
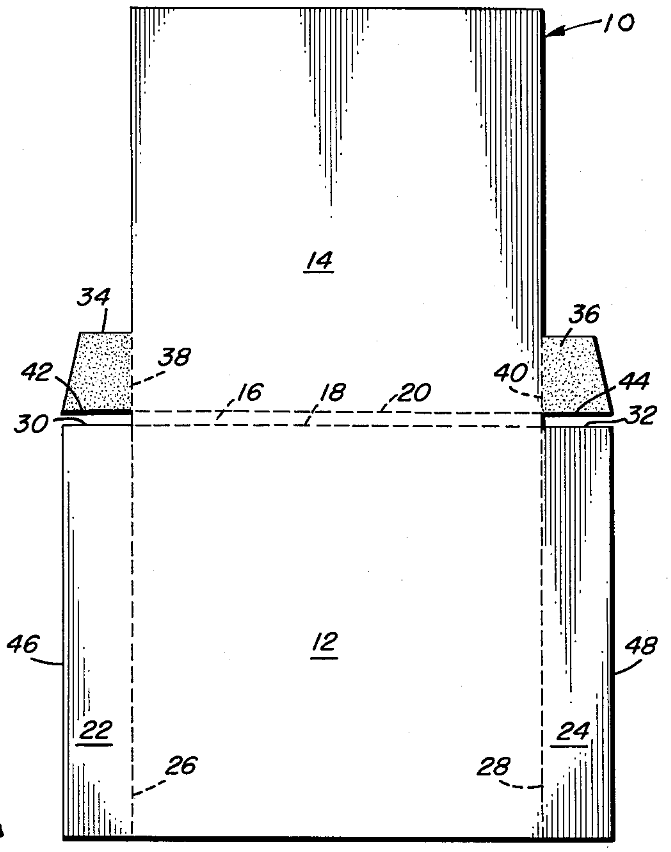
FIGURE 2 is a plan view of a blank from which a preferred form of the invention is made.

Referring to FIGURE 2, 10 designates generally the one-piece blank of bendable material from which the embodiment of the invention illustrated in FIGURES 1, 3, 4, and 5 is made. Panel 12, which is arbitrarily called the rear panel, is spaced from and connected to panel 14, which is arbitrarily called the front panel, by the integral identification strip 16. Score lines 18 and 20 define the adjacent, parallel boundaries of panels 12 and 14 respectively, and the identification strip 16. Full length flaps 22 and 24 are integrally connected to panel 12 at the opposite lateral boundaries thereof at score lines 26 and 28. End edges 30 and 32 of flaps 22 and 24 respectively are substantially colinear with score line 18. Partial length flaps 34 and 36 are integrally connected to panel 14 at the opposite lateral boundaries thereof at score lines 38 and 40 respectively. Preferably, the end edges 42 and 44 of partial length boundary flaps 34 and 36 respectively are approximately the same width as the end edges 30 and 32 of full length boundary flaps 22 and 24 respectively, and are substantially colinear with score line 20.

Figures 3, 5:
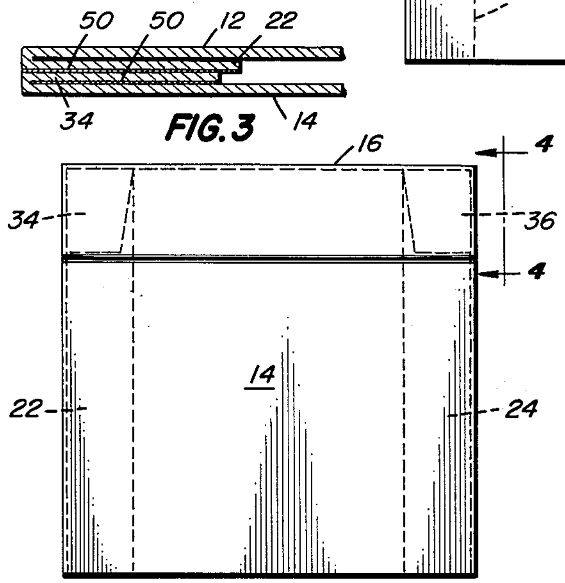
FIGURE 3 is a plan view of the folded envelope made from a blank such as that illustrated in FIGURE 2.
FIGURE 5 is an enlarged sectional view taken along line 5—5 of FIGURE 1.

The square envelope shown in FIGURES 1 and 3 is formed from the proper folding of the blank 10 shown in FIGURE 2. Still referring to FIGURE 2, adhesive may be applied to the top side of flaps 34 and 36 so that when they are folded upwardly and inwardly, they can be adhesively connected to the adjacent area of panel 14. Although adhesive connection of flaps 34 and 36 to panel 14 is desirable in order to render the folded envelope more rigid, it is not essential. Full length boundary flaps 22 and 24 may then be folded upwardly and inwardly along score lines 26 and 28 respectively, into superimposed relation with panel 12. Adhesive may next be applied to the top side of the folded flaps 22 and 24 to subsequently render boundary connection between the top panel 14 and bottom panel 12 at the lateral edges.

Upon the folding of the flaps 22, 24, 34 and 36 as indicated above, the envelope pocket is formed by folding the blank 90° at each of the score lines 18 and 20, such that panels 12 and 14 are brought into opposed relation. The adhesive coating of flaps 22 and 24 enable panels 12 and 14 to be secured at their opposite lateral edges to form an envelope closed on three sides. The width of identification strip 16 depends on the thickness of the envelope material and should be wide enough to extend for the entire thickness of the layers of material at this edge. In this embodiment of the invention, the width of identification strip 16 is most desirably made about 3 or 4 times the thickness of the material from which the jacket is made.

Figure 4:
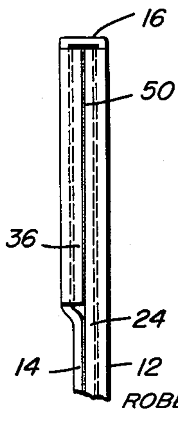
FIGURE 4 is an enlarged partial end or elevation view taken along line 4—4 of FIGURE 3.

FIGURES 3, 4 and 5 best illustrate the position of the flaps when the envelope is folded. Referring to these figures, flaps 22, 24, 34 and 36 act as spacing members between panels 12 and 14 at the end adjacent the strip 16. Flaps 22 and 24 also provide strength for the lateral edges of the envelope. The width of the flap ends 30, 32, 42 and 44 is somewhat dependent upon the rigidity of the envelope material, and should be sufficient to adequately support the identification strip 16 to prevent collapse thereof in its medial portions. Adhesive between the layers of material is indicated at 50.

The shape of flaps 22, 24, 34, and 36 is not critical in this invention, but they may be designed to meet different requirements without varying from the scope of this invention. It is usually desirable for flaps 34 and 36 to be small, so as to be contained entirely within the corners of panel 14 when they are folded and superimposed thereon. This will prevent possible interference with the insertion of a record. In other words, the superimposed partial flaps 34 and 36 should lie within the boundaries of panel 14, but outside the circumferential line of a contained record. For simplicity, flaps 22 and 24 may be tapered or rectangular, i.e., edges 46 and 48 may be straight. Where there is a likelihood that the pressure exerted by flaps 22 and 24 may cause damage to the contained record's delicate surface, the edges of flaps 22 and 24 may be shaped to conform to the outer, non-playing area of the contained record. However, most records have a raised center and outer non-playing area to protect the grooved portion when they are stored.

Figure 6:
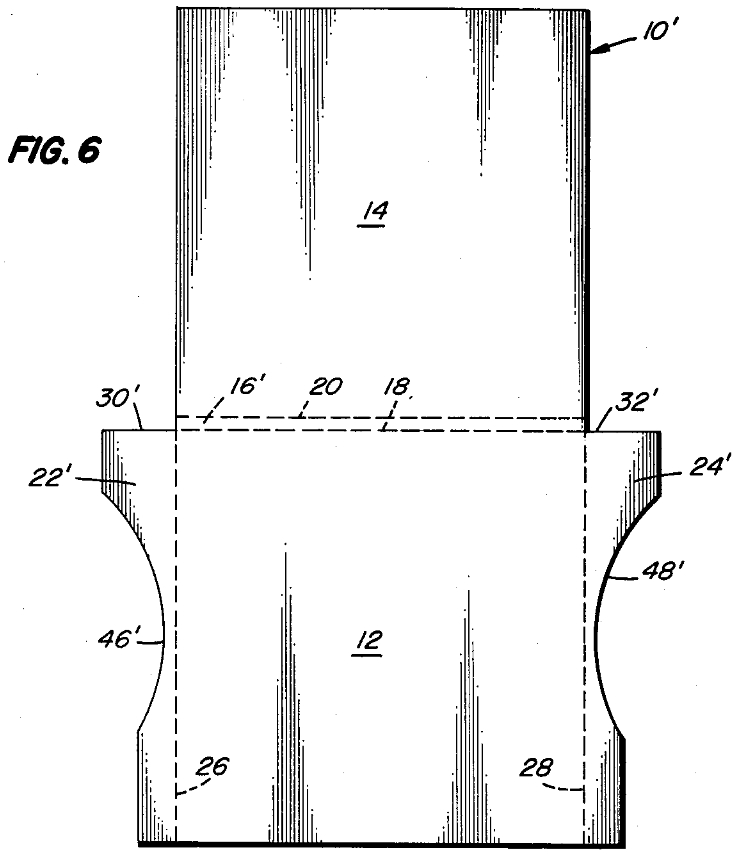
FIGURE 6 is a plan view of a blank from which another preferred form of the invention is made.
Figure 7:
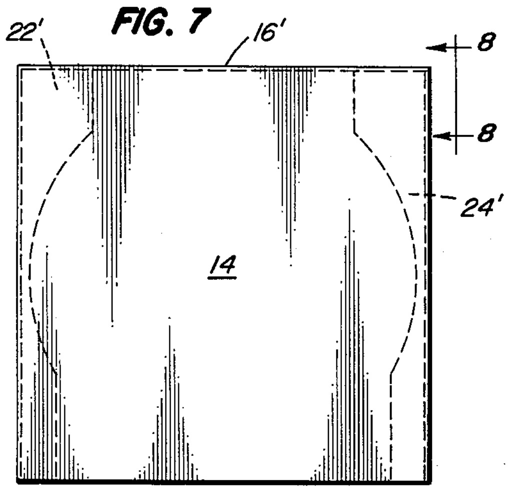
FIGURE 7 is a plan view of the folded envelope made from a blank such as that illustrated in FIGURE 6.
Figure 8:
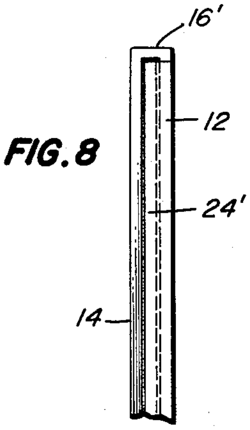
FIGURE 8 is an enlarged partial end or elevation view of the folded envelope, taken along line 8—8 of FIGURE 7.

In FIGURES 6, 7, and 8, a modification of the invention is illustrated. The blank shown in FIGURE 6 is generally designated at 10'. Flaps 22' and 24' extend from opposite lateral boundaries of panel 12. Panel 14 is without flaps. In this embodiment of the invention, the width of identification strip 16 is preferably about 2 or 3 times the thickness of the blank material. Edges 30' and 32' of flaps 22' and 24' respectively are substantially colinear with score line 18. The laterally extending flaps 22' and 24' are shown with contoured edges 46' and 48' respectively, which illustrate how these flaps may be designed to conform to the outer, non-playing area of a contained record to protect its playing surface.

To form the envelope from the blank 10', flaps 22' and 24' are first folded upwardly and inwardly along score lines 26 and 28 respectively, into superimposed relation with panel 12. Adhesive is applied to the top surfaces of flaps 22' and 24'. The pocket is formed by folding the blank 90° at each of the score lines 18 and 20, such that panels 12 and 14 are brought into opposed relationship. The adhesive coating on flaps 22' and 24' enable panels 12 and 14 to be secured at their opposite lateral boundaries to form a pocket closed on three sides.

The envelope shown in FIGURE 7 is produced from the proper folding of the blank shown in FIGURE 6. Flaps 22' and 24' connect the bottom panel 12 and top panel 14 along opposite lateral boundaries. As shown in FIGURE 8, flaps 22' and 24' also act as spacing members between panels 12 and 14, and support strip 16'. Adhesive between the layers of material is indicated at 50.

I claim:

An envelope for record discs or the like comprising (*a*) substantially square and coextensive front and rear panels arranged in opposed relation.

(*b*) an integral identification strip of an appreciable width defined by two spaced parallel fold lines connecting the boundaries of said panels along an edge of said envelope, said lines being of substantially less rigidity than the adjacent areas of said panels and said identification strip, and said strip being substantially flat, lying in a plane substantially perpendicular to said front and rear panels, (*c*) full length boundary flaps extending from one of said panels along the edges thereof perpendicular to the edge having said identification strip, said flaps being folded inwardly and lying between the front and rear panels, and having straight edges of substantial length relative to the length of said identification strip extending in contacting position with the inside surface of said identification strip, (*d*) partial length boundary flaps extending from the other panel along the edges thereof perpendicular to the edge having said identification strip, said partial length boundary flaps being located adjacent the edge of said panel having said identification strip, and folded inwardly to lie between said front and rear panels, said partial length flaps having straight edges of substantial length relative to the length of said identification strip extending in contacting position with the inside surface of said identification strip, the free edges of said partial length flaps lying entirely outside a circle prescribed by a record contained within the envelope, (*e*) an adhesive connecting the envelope's edges perpendicular to the edge having said identification strip, (*f*) the width of said identification strip being approximately 3 to 4 times the thickness of the material from which the envelope is made, and the straight edges of said flaps extending in contacting position with the inside surface of said identification strip forming blunt surfaces to support said identification strip in a flat plane substantially perpendicular to the front and rear panels.

References Cited in the file of this patent

UNITED STATES PATENTS

| | | |
|---|---|---|
| 2,669,350 | Railton | Feb. 16, 1954 |
| 2,807,359 | McKiernan | Sept. 24, 1957 |
| 2,827,223 | Allison | Mar. 18, 1958 |
| 3,061,172 | Loderhose | Oct. 30, 1962 |